A. C. HILEMAN.
CUSHION TIRE.
APPLICATION FILED MAY 18, 1916. RENEWED AUG. 10, 1917.

1,241,380.

Patented Sept. 25, 1917.

WITNESSES:
John B. Schrott
R. L. Stevens

INVENTOR
Andrew C. Hileman
BY
William T. Jones
ATTORNEY

UNITED STATES PATENT OFFICE.

ANDREW C. HILEMAN, OF BUTLER, PENNSYLVANIA, ASSIGNOR, BY DIRECT AND MESNE ASSIGNMENTS, TO TRIPLE AIRLESS TIRE COMPANY, A CORPORATION OF DELAWARE.

CUSHION-TIRE.

1,241,380.     Specification of Letters Patent.     Patented Sept. 25, 1917.

Application filed May 18, 1916, Serial No. 98,409. Renewed August 10, 1917. Serial No. 185,632.

*To all whom it may concern:*

Be it known that I, ANDREW C. HILEMAN, a citizen of the United States, residing at Butler, in the county of Butler and State of Pennsylvania, have invented certain new and useful Improvements in Cushion-Tires, of which the following is a specification, reference being had therein to the accompanying drawings.

My invention relates to improvements in cushion tires, and the objects thereof are to provide a device of this character which will supplant the use of air tubes, and at the same time afford equal resilience, greater mileage and positive freedom from blowouts, punctures and the like, which so frequently obtain during the life of the ordinary pneumatic tire.

To the accomplishment of the recited objects, and others coördinate therewith, the preferred embodiment of my invention resides in the construction and arrangement hereinafter described, shown in the accompanying drawings, and embraced within the scope of the appended claims.

In said drawings:—

Figure 1:
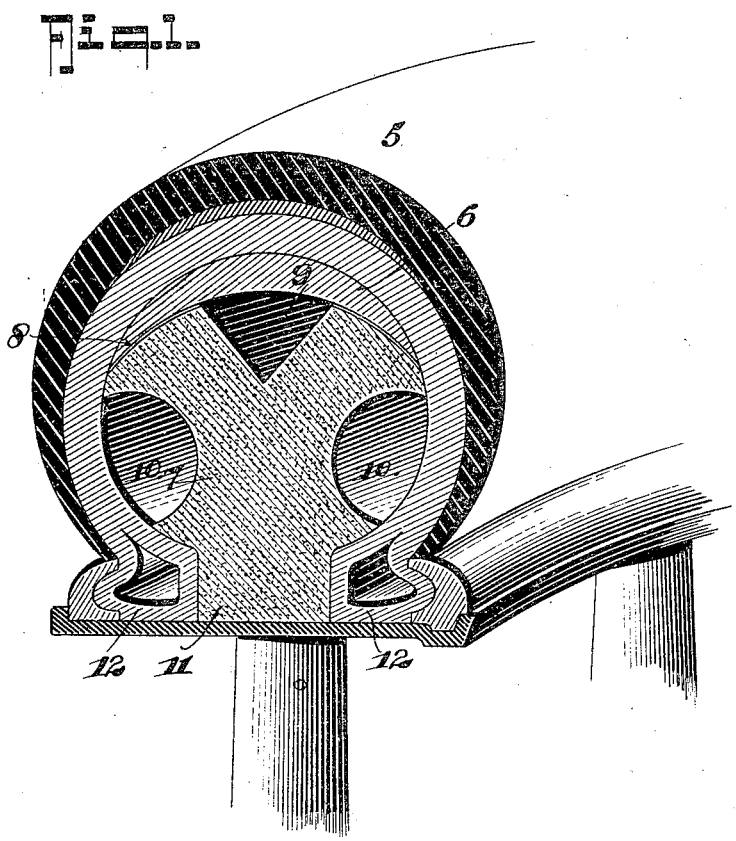
Figure 2:
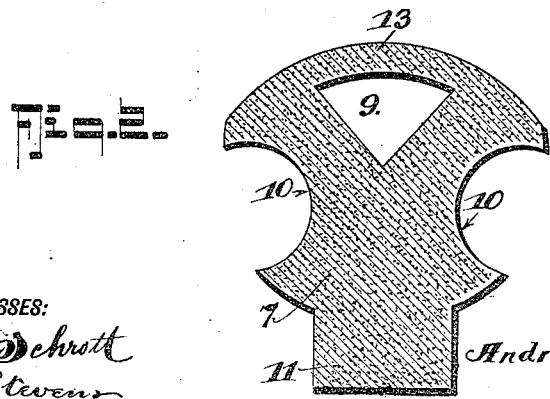

Figure 1 is a fragmentary perspective view, partly in section, of the tire embodying my invention, and Fig. 2 is a transverse sectional view of a modified form of bridge.

Generally speaking, my invention comprises an outer casing or shoe provided with a supplemental laminated inner wall, and a central bridge of rubber or the like with its outer portion vulcanized to said supplemental wall, and formed with circumferentially extending grooves or channels, the base of the bridge being reduced and sustained between the adjacent beads of the casing.

Referring more particularly to the drawings, the numeral 5 designates the casing having a supplemental inner laminated lining 6. 7 is the bridge with its outer surface vulcanized to the supplemental lining, as at 8. A peripheral groove 9, and a pair of diametrically opposed grooves 10 are provided on the top and sides, respectively, of the bridge, and the base 11 is reduced and supported between the adjacent beads 12 of the casing. It will be noted that the greatest width of the groove 9 is substantially equal to the width of the reduced portion 11, and that the grooves 10 are relatively large, resulting in the formation of a bridge which in transverse section is practically Y-shaped.

If desired, the outer groove 9 may be covered or spanned by a comparatively thin integral portion of the rubber, as shown at 13 in Fig. 2. This arrangement serves to prevent the two forked extremities of the core from becoming unduly distorted.

By virtue of the construction hereinbefore described, it will be seen that I have provided a composite tire, the bridge of which instantaneously absorbs all shocks received by the casing, imparts the maximum resilience to the tire, and prevents knuckling of the casing during fast driving or turning corners at a high rate of speed.

What is claimed is:—

1. A composite cushion tire comprising a casing having a supplemental lining, a bridge provided with a peripheral groove and a pair of diametrically opposed side grooves, the outer portion of the bridge being vulcanized to said lining while the inner portion is reduced and confined between the beads of said casing.

2. A composite cushion tire comprising a casing having a supplemental lining, a bridge provided with a peripheral groove and a pair of diametrically opposed grooves, the outer portion of the bridge being vulcanized to said lining while the inner portion is reduced and confined between the beads of said casing, and said peripheral groove having a width substantially equal to the width of the said reduced portion.

3. A composite cushion tire comprising a casing having a supplemental lining, a substantially Y-shaped bridge, the forked extremities of which are vulcanized to said lining, while the base of the bridge is reduced and confined between the beads of the casing.

In testimony whereof, I hereunto affix my signature, in the presence of two witnesses.

ANDREW C. HILEMAN.

Witnesses:
JAMES J. CROWE,
LUELLA H. SIMON.